F. G. & E. A. FLOYD.
Broadcast-Seeder.
No. 63,378.
Patented Apr. 2, 1867.
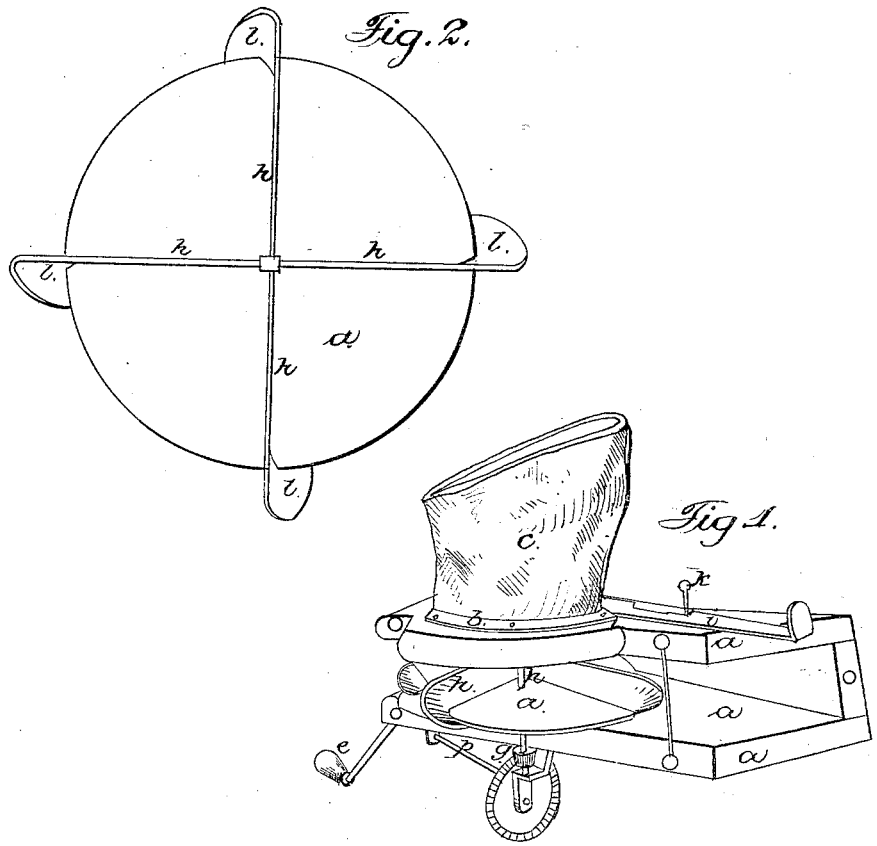

United States Patent Office.

F. G. FLOYD AND E. A. FLOYD, OF MACOMB, ILLINOIS.

*Letters Patent No. 63,378, dated April 2, 1867.*

IMPROVEMENT IN BROAD-CAST SOWERS.

*The Schedule referred to in these Letters Patent and making part of the same.*

TO ALL WHOM IT MAY CONCERN:

Be it known that we, F. G. FLOYD and E. A. FLOYD, of Macomb, in the county of McDonough, and State of Illinois, have invented certain new and useful Improvements in Broad-Cast Seed-Sowers; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention we will proceed to describe it.

Our invention consists in making a convenient, labor-saving broad-cast seed-sower, so that it may be carried by a person on foot, or placed on the rear end of a wagon or other vehicle.

Figure 1 represents a perspective view of the seed-sower complete.

Figure 2 represents the disk with its flanges, from which the seed is thrown or cast.

Figure 3 represents a sectional view of the disk with its flanges.

In fig. 1, $a$ represents the frame of the sower; $b$, a hopper or receptacle for the seed; $c$, a bag attached to the hopper; $d$, a circular disk under the hopper; $e, f, g$, crank, shafting, and gearing, for turning the disk; $h$, flanges on the disk; $i$, slide; and $k$, peg for adjusting the slide. In figs. 2 and 3, $d$ represents the disk; $h$, the flanges; $l$, the curved ends of the flanges. In the frame, within the hopper, and a little to one side of the axle to which the disk is fastened, there is a hole for the grain to pass through. This hole may be made of any size, or entirely closed by means of the slide $i$ and the adjusting peg $k$.

In order to use our sower, if done by a person on foot, we suspend it from the shoulders by a strap, and make the bag $b$ long enough to reach over the shoulder, and to contain as much seed as can be conveniently carried. We then adjust the slide $i$ so as to permit the seed to run through and fall upon the disk $d$, at the same time turning the crank $e$, and, by means of the shafting and gearing $f g$, causing the disk $d$ to revolve rapidly. As the seed falls on to the disk it is carried along the flanges to their curved ends, and thrown broad-cast over the ground. At any time we can stop the flow of the seed by moving the slide, and in like manner increase the quantity of the flow. By this arrangement we are enabled to make a broad-cast seed-sower which, with its revolving disk, having flanges running from its centre, and curved at their ends, closely to resemble in its mode of operation the human arm and hand in broad-cast sowing, with the advantage, however, of sowing evenly and continuously. Our sower may be attached to a wagon or other vehicle and operated in a similar manner.

Having thus described and explained our invention, what we claim, is—

1. The revolving disk $d$, provided with the radial flanges $h$, having their outer ends projecting beyond the periphery of the disk, and curved in the manner shown, substantially as set forth.

2. The combination of the frame $a$, hopper $b$, slide $i$, and revolving disk $d$, constructed as above set forth, all arranged for joint operation as herein described.

F. G. FLOYD,
E. A. FLOYD.

Witnesses:
WM. C. STEINMETZ,
T. M. JORDON.